(12) United States Patent
Xiong et al.

(10) Patent No.: US 9,979,862 B1
(45) Date of Patent: May 22, 2018

(54) BUFFERING METHOD FOR VIDEO PLAYING, STORAGE MEDIUM AND DEVICE

(71) Applicant: UBTECH Robotics Corp., Shenzhen (CN)

(72) Inventors: Youjun Xiong, Shenzhen (CN); Haiwu Su, Shenzhen (CN); Lin Chen, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days. days.

(21) Appl. No.: 15/494,508

(22) Filed: Apr. 23, 2017

(30) Foreign Application Priority Data

Dec. 31, 2016 (CN) .......................... 2016 1 1263416

(51) Int. Cl.
*H04N 7/00* (2011.01)
*H04N 5/073* (2006.01)
*H04L 12/26* (2006.01)
*H04N 7/04* (2006.01)

(52) U.S. Cl.
CPC ....... *H04N 5/0736* (2013.01); *H04L 43/0894* (2013.01); *H04L 43/16* (2013.01); *H04N 7/04* (2013.01)

(58) Field of Classification Search
CPC ........ H04N 5/0736; H04N 7/04–7/708; H04N 7/12; H04L 43/0894; H04L 43/16
See application file for complete search history.

(56) References Cited

U.S. PATENT DOCUMENTS 9,324,375 B1 * 4/2016 Casalena ................. H04L 65/80
2012/0009892 A1 * 1/2012 Yen ...................... H04B 1/1027
455/334

* cited by examiner

*Primary Examiner* — Michael Lee
*Assistant Examiner* — Humam Satti

(57) ABSTRACT

A buffering method for video playing includes: playing a video according to an amount of video buffer data and a predefined playing threshold, and monitoring a network speed; determining whether the network speed meets a predefined condition; and updating a previously set video buffer depth and the playing threshold according to the network speed if the network speed meets the predefined condition. A storage medium and device are also provided.

8 Claims, 3 Drawing Sheets

BUFFERING METHOD FOR VIDEO PLAYING, STORAGE MEDIUM AND DEVICE

CROSS REFERENCE TO RELATED APPLICATIONS

This application claims priority to Chinese Patent Application No. 201611263416.8, filed Dec. 31, 2016, which is hereby incorporated by reference herein as if set forth in its entirety.

BACKGROUND

1. Technical Field

The present disclosure generally relates to video playing control, and particularly to a buffering method for video playing, a storage medium and a device.

2. Description of Related Art

Video buffering has been widely used and is very important since it will affect user experience. There may exist a problem that the video playing buffering cannot automatically adapt to the network speed. That is, in the case of low network speed, live video would stutter.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
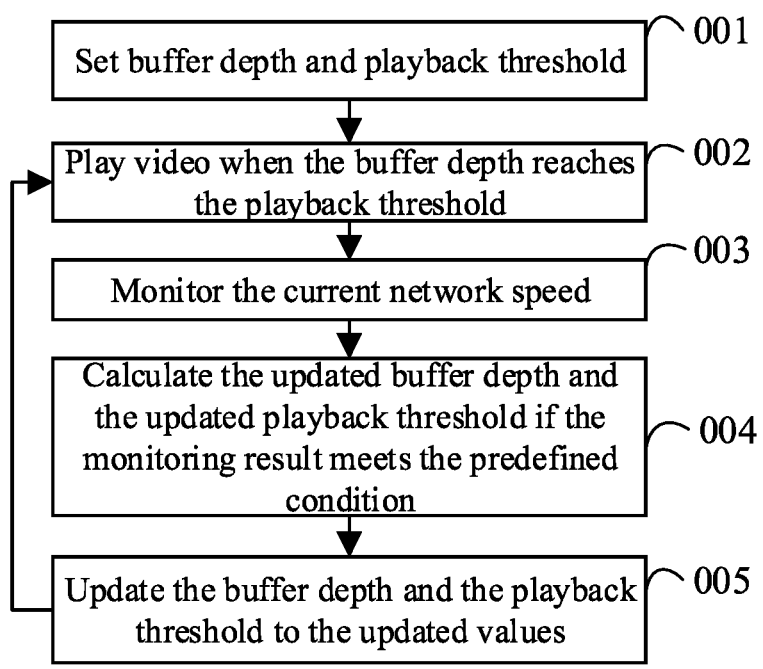
FIG. 1 is an exemplary flow chart of a buffering method for video playing according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Referring to FIG. 1, in one embodiment, a buffering method for video playing includes steps as described below.

Step 001: setting a buffer depth and an initial playing threshold and processing video buffering.

The buffer depth and the initial playing threshold are set according to normal network speed. The buffer depth and the initial playing threshold here refer to the storage capacity, the unit of which is megabyte. The buffer depth is greater than the initial playing threshold. The initial buffer depth is represented by L1, and the initial playing threshold is represented by S1. After setting, the transmission of video data via the network and the buffering of the video data are started.

Step 002: playing a video when the video buffer depth reaches the initial playing threshold.

When the amount of buffered video data reaches the initial playing threshold, the buffered video data will be read and played.

Step 003: monitoring the network speed of a stream of the video.

During the playing of video, the network speed of a stream of the video is monitored in real time. Specifically, the buffering and storing of the video data from the network is monitored to determine if a stuttering in the video stream occurs. If a stuttering in the video stream occurs, it means that the transmission of the video data to the buffer is faster than the reading and playing of the buffered video data, and the buffer is full of video data. In this case, the real-time delay is long during video playing. The reading and playing of the buffered video data is monitored to determine if a stuttering in the video stream occurs. If a stuttering in the video stream occurs, it means that the transmission of the video data to the buffer is slower than the reading and playing of the buffered video data, and there has no buffered video data in the buffer. In this case, the video would stutter/lag during video playing.

Step 004: calculating an updated buffer depth and an updated playing threshold if the monitoring result meets a predefined condition.

Specifically, the predefined condition refers to that a stuttering in the video stream occurs during the transmission of the video data via network and buffering of the video data or a stuttering in the video stream occurs when the buffered video data is read and played. When predefined condition is met, a duration Tp during which video data of a fixed-length is played, a duration Td during which the fixed-length video data is received and buffered, a duration T1 of a previous stuttering and a duration T2 of a current stuttering are read. An updated buffer depth L2 is calculated based on these read values, the initial buffer depth L1 and the initial playing threshold S1 according to the following formula:

$$L2 \ll L1\left(1 \frac{Td\ Tp}{Td\ Tp} \frac{T1\ T2}{T2}\right).$$

An updated playing threshold S2 is calculated based on the updated buffer depth L2, the initial buffer depth L1 and the initial playing threshold S1 according to the following formula:

$$S2 \ll S1\left(1 \frac{L2\ L1}{L1\ L2}\right).$$

This formula uses a non-linear relationship to achieve a multi-factor adjustment of the playing threshold. A non-linear adjustment is performed on the basis of the original playing threshold, which achieves rapid adaptation of the buffer depth to the network speed, and reduces the occurrence of stuttering of video stream and improves the real-time performance of video playing.

Step 005: updating the buffer depth and the initial playing threshold.

Specifically, the initial buffer depth L1 is replaced with the updated buffer depth L2, and the initial updated playing threshold S1 is replaced with the updated playing threshold S2. After this, the process returns back to the step 002 of playing a video. The network speed is monitored during the video playing. The buffer depth and the playing threshold adapting the current network speed are calculated, and then the initial buffer depth and the initial playing threshold are updated. When the network speed is slow, the buffer depth and the playing threshold are increased, enabling the buffer to store more data to play, which reduces the number and duration of the situation that the amount of buffered data is less than the amount of data to be read and played. When the network speed is fast, the buffer depth is increased and the playing threshold is reduced, which reduces the delay time of live video.

Figure 2:
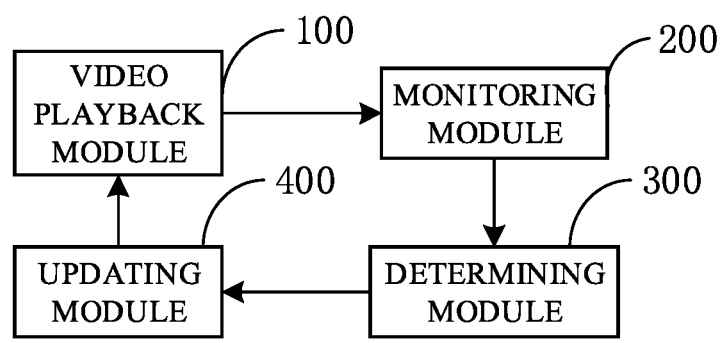
FIG. 2 is a block diagram of a of modules for video playing according to one embodiment.

Referring to FIG. 2, a non-transitory storage medium having stored thereon one or more computer readable programs that are executable by a processor, the one or more computer readable programs includes:

a video playing module 100 used to play a video according to an amount of video buffer data and a predefined playing threshold;

a monitoring module 200 used to monitor a network speed of a stream of the video;

a determining module 300 used to determine whether the network speed meets a predefined condition; and an updating module 400 used to update a previously set video buffer depth and the playing threshold according to the network speed if the network speed meets the predefined condition.

In one embodiment, the video playing module 100 is used to determine whether the amount of video buffer data reaches the predefined playing threshold, and read video data from a video buffer and play the video data if the amount of video buffer data reaches the predefined playing threshold. The determining module 300 is used to determine whether a stuttering in the video stream occurs when receiving video data during buffering video; or determine whether a stuttering in the video stream occurs when reading video data during playing of the video. The updating module 400 is used to: calculate an updated buffer depth L2 and an updated playing threshold S2 based on a duration Tp during which fixed-length video data is played, a duration Td during which the fixed-length video data is buffered, a duration T1 of a previous stuttering, and a duration T2 of a current stuttering if the network speed meets a predefined condition, and replace the initial buffer depth L1 and the initial playing threshold S1 with the updated buffer depth L2 and the updated playing threshold S2, respectively.

In one embodiment, the updated buffer depth L2 and the updated playing threshold S2 are respectively calculated according to the following formulas:

$$L2 \ll L1\left(1 \frac{Td\ Tp}{Td\ Tp} \frac{T1\ T2}{T2}\right) \text{ and}$$

$$S2 \ll S1\left(1 \frac{L2\ L1}{L1\ L2}\right).$$

This formula uses a non-linear relationship to achieve a multi-factor adjustment of the playing threshold. A non-linear adjustment is performed on the basis of the original playing threshold, which achieves rapid adaptation of the buffer depth to the network speed, and reduces the occurrence of stuttering and improves the real-time performance of video playing.

The storage medium of the present embodiment and the method of the foregoing embodiment are based on two aspects under the same inventive concept. The method has been described in detail. Those skilled in the art will be able to understand clearly the structure of the storage medium, which will not be described here for the sake of simplicity of the specification.

Figure 3:
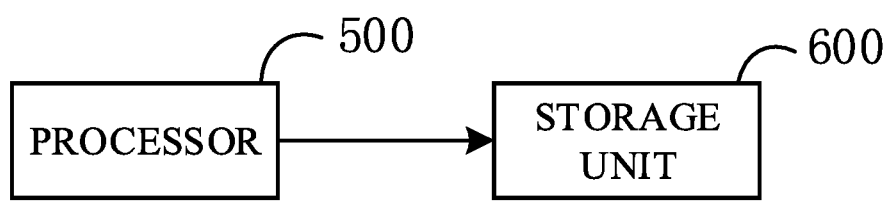
FIG. 3 is a block diagram of a device according to one embodiment.

Referring to FIG. 3, in one embodiment, a device includes a processor 600 and a storage unit 500 for storing a plurality of program instructions that, when executed by the processor, perform the step of: playing a video according to an amount of video buffer data and a predefined playing threshold, and monitor a network speed of a stream of the video; determining whether the network speed meets a predefined condition; and updating a previously set video buffer depth and the playing threshold according to the network speed if the network speed meets the predefined condition.

In one embodiment, the step of playing a video according to an amount of video buffer data and a predefined playing threshold, includes: determining whether the amount of video buffer data reaches the predefined playing threshold; and if yes, reading video data from a video buffer and playing the video data.

In one embodiment, the step of determining whether the network speed meets a predefined condition, includes: determining whether a stuttering in the video stream occurs when receiving video data during buffering video; or determining whether a stuttering in the video stream occurs when reading video data during playing of the video.

In one embodiment, the step of updating a previously set video buffer depth and the playing threshold according to the network speed if the network speed meets the predefined condition, includes: if a stuttering in the video stream occurs when receiving video data during buffering video or when reading video data during playing of the video, calculating an updated buffer depth and an updated playing threshold based on a duration during which fixed-length video data is played, a duration during which the fixed-length video data is buffered, a duration of a previous stuttering, a duration of a current stuttering, an initial buffer depth and an initial playing threshold, and replacing the initial buffer depth and the initial playing threshold with the updated buffer depth and the updated playing threshold, respectively.

The device of the present embodiment and the method of the foregoing embodiment are based on two aspects under the same inventive concept. The method has been described in detail. Those skilled in the art will be able to understand clearly the structure of the device, which will not be described here for the sake of simplicity of the specification.

For the sake of convenience of description, the above device and medium are described in terms of functions described in various modules. The functionality of each module may be implemented in the same or more software and/or hardware when implementing the present invention.

As will be understood from the description of the above embodiments, it will be apparent to those skilled in the art that the present invention can be realized by means of software plus a common hardware platform. Based on this understanding, the technical solution of the present invention, or the improvement relative to the prior art, may be embodied in the form of a software product which may be stored in a storage medium such as ROM/RAM, disc, CD, etc., including a number of instructions for enabling a computer device (which may be a personal computer, a server, or a network device, etc.) to perform the methods described in certain portions of the various embodiments or embodiments of the present invention.

The described embodiment of the device is merely illustrative. The modules or units described as separate components may or may not be physically separate, and the components indicated as modules or units may or may not be physical modules. They can be located in one place, or can be distributed to multiple network modules. Part or all of the elements may be selected according to the actual needs to achieve the object of the present embodiment. One of ordinary skill in the art will understand and practice without creative work.

The present invention may be used in a number of general purpose or special computing system environments or configurations, such as personal computers, server computers, handheld devices or portable devices, tablet computer devices, multiprocessor systems, microprocessor-based systems, set-top boxes, programmable consumer electronics devices, web PCs, small computers, large computers, distributed computing environments including any of the above system or device.

The foregoing embodiments has the advantages that the updated buffer depth and the updated playing threshold adapting the current network speed are calculated by monitoring the network speed and the initial buffer depth and the initial playing threshold are updated to the updated buffer depth and the updated playing threshold, so that the playing of the current video adapt the current network speed, thereby reducing the number of occurrence of stuttering and delay time.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A buffering method for video playing, comprising:
    playing a video according to an amount of video buffer data and a predefined playing threshold, and monitoring a network speed of a stream of the video;
    determining whether the network speed meets a predefined condition; and
    responsive to the network speed meeting the predefined condition, updating a previously set video buffer depth and the playing threshold according to the network speed;
    wherein the step of determining whether the network speed meets a predefined condition, comprises:
    determining whether a stuttering in the video stream occurs when receiving video data during buffering video; or
    determining whether a stuttering in the video stream occurs when reading video data during playing of the video; and
    wherein the step of updating a previously set video buffer depth and the playing threshold according to the network speed comprises:
    if a stuttering in the video stream occurs when receiving video data during buffering video or when reading video data during playing of the video, calculating an updated buffer depth and an updated playing threshold based on a duration during which fixed-length video data is played, a duration during which the fixed-length video data is buffered, a duration of a previous stuttering, a duration of a current stuttering, an initial buffer depth and an initial playing threshold, and replacing the initial buffer depth and the initial playing threshold with the updated buffer depth and the updated playing threshold, respectively.

2. The method of claim 1, wherein the step of playing a video according to an amount of video buffer data and a predefined playing threshold, comprises:
    determining whether the amount of video buffer data reaches the predefined playing threshold; and
    if yes, reading video data from a video buffer and playing the video data.

3. The method of claim 1, wherein the updated buffer depth is calculated according to the following formula:

$$L2 = L1\left(1 + \frac{Td - Tp}{Td \times Tp} + \frac{T1 - T2}{T2}\right),$$

and the updated playing threshold is calculated according to the following formula:

$$S2 = S1\left(1 + \frac{L2 - L1}{L1 \times L2}\right),$$

where L2 represents the updated buffer depth, L1 represents initial buffer depth, Td represents the duration during which the fixed-length video data is buffered, Tp represents the duration during which fixed-length video data is played, T1 represents the duration of a previous stuttering, T2 represents the duration of a current stuttering, S2 represents the updated playing threshold, and S1 represents the initial playing threshold.

4. A non-transitory storage medium having stored thereon one or more computer readable programs that are executable by a processor, the one or more computer readable programs comprising:
    a video playing module configured to play a video according to an amount of video buffer data and a predefined playing threshold;
    a monitoring module configured to monitor a network speed of a stream of the video;
    a determining module configured to determine whether the network speed meets a predefined condition; and
    responsive to the network speed meeting the predefined condition, an updating module configured to update a previously set video buffer depth and the playing threshold according to the network speed;
    wherein the video playing module is configured to determine whether the amount of video buffer data reaches the predefined playing threshold, and read video data from a video buffer and play the video data if the amount of video buffer data reaches the predefined playing threshold; and the determining module is configured to determine whether a stuttering in the video stream occurs when receiving video data during buffering video; or determine whether a stuttering in the video stream occurs when reading video data during playing of the video;
    wherein the updating module is configured to: calculate an updated buffer depth and an updated playing threshold based on a duration during which fixed-length video data is played, a duration during which the fixed-length video data is buffered, a duration of a previous stuttering and a duration of a current stuttering if stuttering in the video stream occurs when receiving video data during buffering video or when reading video data during playing of the video, and replace the initial buffer depth and the initial playing threshold with the updated buffer depth and the updated playing threshold, respectively.

5. The non-transitory storage medium of claim 4, wherein the updated buffer depth is calculated according to the following formula:

$$L2 = L1\left(1 + \frac{Td - Tp}{Td \times Tp} + \frac{T1 - T2}{T2}\right),$$

and the updated playing threshold is calculated according to the following formula $$S2 = S1\left(1 + \frac{L2 - L1}{L1 \times L2}\right),$$

where L2 represents the updated buffer depth, L1 represents initial buffer depth, Td represents the duration during which the fixed-length video data is buffered, Tp represents the duration during which fixed-length video data is played, T1 represents the duration of a previous stuttering, T2 represents the duration of a current stuttering, S2 represents the updated playing threshold, and S1 represents the initial playing threshold.

6. A video playing device comprising:
   a processor; and
   a storage unit for storing a plurality of program instructions that, when executed by the processor, perform the step of:
   playing a video according to an amount of video buffer data and a predefined playing threshold, and monitoring a network speed of a stream of the video;
   determining whether the network speed meets a predefined condition; and
   responsive to the network speed meeting the predefined condition, updating a previously set video buffer depth and the playing threshold according to the network speed;
   wherein the step of determining whether the network speed meets a predefined condition, comprises:
   determining whether stuttering in the video stream occurs when receiving video data during buffering video; or
   determining whether stuttering of the video stream occurs when reading video data during playing of the video; and
   wherein the predefined condition comprises:
   responsive to stuttering of the video stream occurs when receiving video data during buffering video or when reading video data during playing of the video, calculating an updated buffer depth and an updated playing threshold based on a duration during which fixed-length video data is played, a duration during which the fixed-length video data is buffered, a duration of a previous stuttering, a duration of a current stuttering, and initial buffer depth and an initial playing threshold, wherein the predetermined condition further comprises replacing the initial buffer depth and the initial playing threshold with the updated buffer depth and the updated playing threshold, respectively.

7. The video playing device of claim 6, wherein the step of playing a video according to an amount of video buffer data and a predefined playing threshold, comprises:
   determining whether the amount of video buffer data reaches the predefined playing threshold; and
   if yes, reading video data from a video buffer and playing the video data.

8. The video playing device of claim 6, wherein the updated buffer depth is calculated according to the following formula:

$$L2 = L1\left(1 + \frac{Td - Tp}{Td \times Tp} + \frac{T1 - T2}{T2}\right),$$

and the updated playing threshold is calculated according to the following formula:

$$S2 = S1\left(1 + \frac{L2 - L1}{L1 \times L2}\right),$$

where L2 represents the updated buffer depth, L1 represents initial buffer depth, Td represents the duration during which the fixed-length video data is buffered, Tp represents the duration during which fixed-length video data is played, T1 represents the duration of a previous stuttering, T2 represents the duration of a current stuttering, S2 represents the updated playing threshold, and S1 represents the initial playing threshold.

* * * * *